(12) United States Patent
Vise et al.

(10) Patent No.: US 10,641,169 B2
(45) Date of Patent: May 5, 2020

(54) HYBRID COMBUSTOR ASSEMBLY AND METHOD OF OPERATION

(71) Applicant: General Electric Company, Schenectady, NY (US)

(72) Inventors: Steven Clayton Vise, Loveland, OH (US); Joseph Zelina, Waynesville, OH (US); Arthur Wesley Johnson, Cincinnati, OH (US); Clayton Stuart Cooper, Loveland, OH (US); Sibtosh Pal, Mason, OH (US)

(73) Assignee: General Electric Company, Schenectady, NY (US)

( * ) Notice: Subject to any disclaimer, the term of this patent is extended or adjusted under 35 U.S.C. 154(b) by 355 days.

(21) Appl. No.: 15/618,682

(22) Filed: Jun. 9, 2017

(65) Prior Publication Data
US 2018/0355793 A1    Dec. 13, 2018

(51) Int. Cl.
*F02C 3/16*   (2006.01)
*F23R 3/00*   (2006.01)
(Continued)

(52) U.S. Cl.
CPC .............. *F02C 3/16* (2013.01); *F02C 7/222* (2013.01); *F02K 7/00* (2013.01); *F02K 7/08* (2013.01);
(Continued)

(58) Field of Classification Search
CPC ..... F02K 7/00; F02K 7/08; F02K 7/10; F02K 7/20
See application file for complete search history.

(56) References Cited

U.S. PATENT DOCUMENTS 3,040,516 A * 6/1962 Brees .................. F02K 7/10
                                                             60/208
3,677,012 A * 7/1972 Batscha ............... F02K 3/065
                                                             60/262
(Continued)

FOREIGN PATENT DOCUMENTS

| CN | 101285590 A | 10/2008 |
|---|---|---|
| CN | 104153884 A | 11/2014 |
| EP | 1473457 A2 | 11/2004 |

OTHER PUBLICATIONS

Chinese Office Action and Search Report Corresponding to Application No. 201810587335 dated Jan. 14, 2020.

*Primary Examiner* — Todd E Manahan
*Assistant Examiner* — Thuyhang N Nguyen
(74) *Attorney, Agent, or Firm* — Dority & Manning, P.A.

(57) ABSTRACT

A hybrid combustion system, and method of operation, for a propulsion system is provided. The hybrid combustion system defines a radial direction, a circumferential direction, and a longitudinal centerline in common with the propulsion system extended along a longitudinal direction. The hybrid combustion system includes a rotating detonation combustion (RDC) system comprising an annular outer wall and an annular inner wall each generally concentric to the longitudinal centerline and together defining a RDC chamber and a RDC inlet, the RDC system further comprising a nozzle located at the RDC inlet defined by a nozzle wall. The nozzle defines a lengthwise direction extended between a nozzle inlet and a nozzle outlet along the lengthwise direction, and the nozzle inlet is configured to receive a flow of oxidizer. The nozzle further defines a throat between the nozzle inlet and the nozzle outlet, and wherein the nozzle defines a converging-diverging nozzle. The hybrid combustion system further includes an inner liner extended generally along the longitudinal direction; an outer liner extended generally (Continued)

along the longitudinal direction and disposed outward of the inner liner along the radial direction; a bulkhead wall disposed at the upstream end of the inner and outer liners, in which the bulkhead wall extends generally in the radial direction and couples the inner liner and the outer liner, and wherein the inner liner, the outer liner, and the bulkhead wall together define a primary combustion chamber, and further wherein the RDC system and bulkhead wall together define a RDC outlet through the bulkhead wall and adjacent to the primary combustion chamber; and a fuel manifold assembly extended at least partially through the bulkhead wall, in which the fuel manifold assembly defines a fuel manifold assembly exit disposed adjacent to the primary combustion chamber.

19 Claims, 6 Drawing Sheets

(51) Int. Cl.
| | | |
|---|---|---|
| | *F02C 7/22* | (2006.01) |
| | *F23R 3/58* | (2006.01) |
| | *F23R 7/00* | (2006.01) |
| | *F02K 7/00* | (2006.01) |
| | *F02K 7/08* | (2006.01) |
| | *F02K 7/20* | (2006.01) |
| | *F02K 7/10* | (2006.01) |

(52) U.S. Cl.
CPC ................. *F02K 7/10* (2013.01); *F02K 7/20* (2013.01); *F23R 3/002* (2013.01); *F23R 3/58* (2013.01); *F23R 7/00* (2013.01); *F23R 2900/00015* (2013.01)

(56) References Cited

U.S. PATENT DOCUMENTS

| | | |
|---|---|---|
| 3,879,937 A | 4/1975 | Jenny |
| 5,345,758 A | 9/1994 | Bussing |
| 5,901,550 A | 5/1999 | Bussing et al. |
| 6,526,936 B2 | 3/2003 | Nalim |
| 6,931,833 B2 | 8/2005 | Lupkes |
| 7,621,118 B2 | 11/2009 | Snyder et al. |
| 7,891,164 B2 | 2/2011 | Janssen et al. |
| 8,082,725 B2 | 12/2011 | Younsi et al. |
| 8,117,828 B2 | 2/2012 | Snyder et al. |
| 9,046,057 B2 | 6/2015 | Efremkin et al. |
| 9,188,002 B2 | 11/2015 | Lee |
| 9,556,794 B2 * | 1/2017 | Falempin ................. F02C 3/14 |
| 2005/0120700 A1 | 6/2005 | Tangirala et al. |
| 2019/0017437 A1 * | 1/2019 | Tangirala ................. F02C 3/16 |

* cited by examiner

HYBRID COMBUSTOR ASSEMBLY AND METHOD OF OPERATION

FIELD

The present subject matter relates generally to a system of continuous detonation in a propulsion system.

BACKGROUND

Many propulsion systems, such as gas turbine engines, are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such propulsion systems generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are welcomed nonetheless.

Accordingly, improvements in engine efficiency have been sought by modifying the engine architecture such that the combustion occurs as a detonation in either a continuous or pulsed mode. The pulsed mode design involves one or more detonation tubes, whereas the continuous mode is based on a geometry, typically an annulus, within which single or multiple detonation waves spin. For both types of modes, high energy ignition detonates a fuel/air mixture that transitions into a detonation wave (i.e., a fast moving shock wave closely coupled to the reaction zone). The detonation wave travels in a Mach number range greater than the speed of sound (e.g., Mach 4 to 8) with respect to the speed of sound of the reactants. The products of combustion follow the detonation wave at the speed of sound relative to the detonation wave and at significantly elevated pressure. Such combustion products may then exit through a nozzle to produce thrust or rotate a turbine. With various rotating detonation systems, the task of preventing backflow into the lower pressure regions upstream of the rotating detonation has been addressed by providing a steep pressure drop into the combustion chamber. However, such may reduce the efficiency benefits of the rotating detonation combustion system.

It is generally known in the art that combustion chamber geometry is defined by a desired detonation cell size based on the fuel-oxidizer mixture and the pressure, temperature, and stoichiometric ratio thereof. Various combinations of fuel-oxidizer mixture, pressure, temperature, and stoichiometric ratio (e.g., at various operating conditions of the propulsion system) generally renders a rotating detonation combustion system inefficient at more than one operating condition.

Therefore, there is a need for a propulsion system and combustion system that may benefit from a rotating detonation combustion system while maintaining operability and efficiency across a plurality of pressures and temperatures across a plurality of operating conditions.

BRIEF DESCRIPTION

Aspects and advantages of the invention will be set forth in part in the following description, or may be obvious from the description, or may be learned through practice of the invention.

The present disclosure is directed to a hybrid combustion system, and method of operation, for a propulsion system. The hybrid combustion system defines a radial direction, a circumferential direction, and a longitudinal centerline in common with the propulsion system extended along a longitudinal direction. The hybrid combustion system includes a rotating detonation combustion (RDC) system comprising an annular outer wall and an annular inner wall each generally concentric to the longitudinal centerline and together defining a RDC chamber and a RDC inlet, the RDC system further comprising a nozzle located at the RDC inlet defined by a nozzle wall. The nozzle defines a lengthwise direction extended between a nozzle inlet and a nozzle outlet along the lengthwise direction, and the nozzle inlet is configured to receive a flow of oxidizer. The nozzle further defines a throat between the nozzle inlet and the nozzle outlet, and wherein the nozzle defines a converging-diverging nozzle. The hybrid combustion system further includes an inner liner extended generally along the longitudinal direction; an outer liner extended generally along the longitudinal direction and disposed outward of the inner liner along the radial direction; a bulkhead wall disposed at the upstream end of the inner and outer liners, in which the bulkhead wall extends generally in the radial direction and couples the inner liner and the outer liner, and wherein the inner liner, the outer liner, and the bulkhead wall together define a primary combustion chamber, and further wherein the RDC system and bulkhead wall together define a RDC outlet through the bulkhead wall and adjacent to the primary combustion chamber; and a fuel manifold assembly extended at least partially through the bulkhead wall, in which the fuel manifold assembly defines a fuel manifold assembly exit disposed adjacent to the primary combustion chamber.

In various embodiments, the fuel manifold assembly is further in fluid communication with the nozzle of the RDC system. The RDC system defines a fuel injection port defining a fuel outlet located between the nozzle inlet and the nozzle outlet for providing fuel to the flow of oxidizer received through the nozzle inlet. In one embodiment, the fuel manifold assembly is configured to provide a first flow of fuel to the primary combustion chamber and a second flow of fuel to the fuel injection port of the RDC system. In another embodiment, the fuel manifold assembly is configured to provide the first flow of fuel to the primary combustion chamber at a first operating condition and the second flow of fuel to the fuel injection port at a second operating condition different from the first operating condition.

In one embodiment of the hybrid combustion system, the inner liner, the outer liner, the bulkhead wall, and the fuel manifold assembly define, at least in part, a deflagrative combustion system.

In another embodiment, the RDC system defines a plurality of nozzles each disposed in adjacent arrangement along the circumferential direction.

In yet another embodiment, the RDC system defines the nozzle wall generally annular around the longitudinal centerline, the nozzle wall defining an inner annular nozzle wall and an outer annular nozzle wall.

In various embodiments, the primary combustion chamber further defines a trapped vortex cavity within the primary combustion chamber. In one embodiment, the trapped vortex cavity is defined by one or more of the outer liner and the inner liner, and wherein one or more of the outer liner and the inner liner defines a first wall at a first radius, a second wall at a second radius different from the first radius, and a transition wall therebetween coupling the first wall and the second wall. In another embodiment, at least one of the bulkhead wall, the outer liner, and the inner liner defines one or more secondary airflow openings adjacent to the primary combustion chamber. In yet another embodiment, at least one of the secondary airflow openings is adjacent to the trapped vortex cavity within the primary combustion chamber.

The present disclosure is further directed to a method of operating a combustion section for a propulsion system. The combustion section defines a rotating detonation combustion (RDC) system defining a RDC chamber, and further defines a fuel manifold assembly exits adjacent to a primary combustion chamber defined by an inner liner, and outer liner, and a bulkhead wall. The method includes providing a first flow of fuel through one or more of the plurality of fuel manifold assembly exits into the primary combustion chamber; providing a flow of oxidizer through the combustion section; igniting a mixture of the first flow of fuel and the oxidizer in the primary combustion chamber to generate a first flow of combustion gases; providing a second flow of fuel through a fuel injection port of the RDC system; mixing the second flow of fuel and the oxidizer in the RDC chamber; and igniting the mixture of the second flow of fuel and the oxidizer in the RDC chamber to generate a second flow of combustion gases.

In one embodiment of the method, igniting the mixture of the second flow of fuel and oxidizer in the RDC chamber to generate a second flow of combustion gases includes providing the second flow of combustion gases through the primary combustion chamber.

In various embodiments of the method, providing a flow of oxidizer through the combustion section includes generating a flow of oxidizer at a first operating condition. In one embodiment, igniting a mixture of the first flow of fuel and the oxidizer in the primary combustion chamber includes igniting the fuel-oxidizer mixture in the primary combustion chamber at the first operating condition.

In still various embodiments of the method, providing a flow of oxidizer through the combustion section includes generating a flow of oxidizer at a second operating condition. In one embodiment, providing a second flow of fuel through a fuel injection port of the RDC system occurs at the second operating condition. In another embodiment, mixing the second flow of fuel and the oxidizer in the RDC chamber occurs at the second operating condition.

In one embodiment of the method, providing a second flow of fuel through the RDC system includes discontinuing a first flow of fuel through one or more of the fuel manifold assembly exits.

In another embodiment, providing a flow of oxidizer through the combustion section includes providing a first flow of oxidizer through one or more of the fuel manifold assembly exit, the bulkhead wall, the inner liner, and the outer liner to the primary combustion chamber, and wherein providing a flow of oxidizer further includes providing a second flow of oxidizer through the RDC system to the primary combustion chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
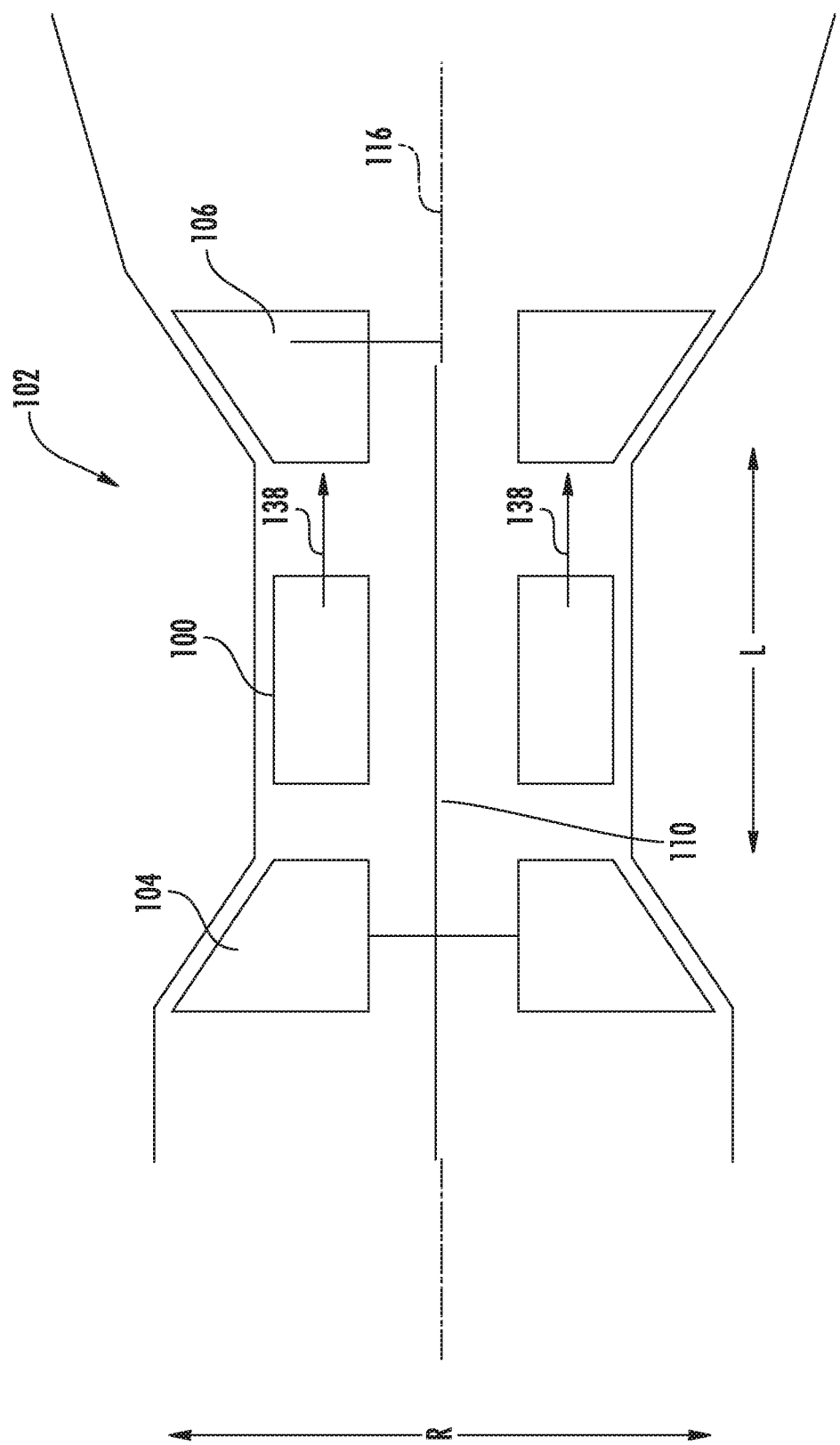
FIG. 1 is a schematic view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a propulsion system or vehicle, and refer to the normal operational attitude of the propulsion system or vehicle. For example, with regard to a propulsion system, forward refers to a position closer to a propulsion system inlet and aft refers to a position closer to a propulsion system nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A hybrid combustion system for a propulsion system is generally provided that may provide efficiencies of a rotating detonation combustion system while maintaining operability and efficiency across a plurality of pressure and temperature conditions across a plurality of operating conditions of the propulsion system. The hybrid combustion system and methods of operation provided herein may improve specific fuel consumption and fuel burn at one or more operating conditions while further maintaining operability at transient or extreme operating conditions. For example, the rotating detonation combustion system may be configured and optimized for a steady state pressure and temperature condition at which the hybrid combustion system and propulsion system may operate for extended periods of time while the primary combustion chamber and fuel manifold assembly are configured to operate at transient conditions greater and/or lesser than the extended operating conditions of the rotating detonation combustion system. For example, in one embodiment, the rotating detonation combustion system may be configured (e.g., sized, optimized, etc.) for an intermediate or mid-power condition, such as cruise, and the primary combustion chamber (e.g., defining a deflagrative combustion system) is configured for all other operating conditions (e.g., low power, high power, light-off, etc.).

Referring now to the figures, FIG. 1 depicts a propulsion system 102 including a hybrid combustion system 100 ("hybrid combustor 100") in accordance with an exemplary embodiment of the present disclosure. The propulsion system 102 generally includes an inlet section 104 and an outlet section 106, with the hybrid combustor 100 located downstream of the inlet section 104 and upstream of the exhaust section 106. In various embodiments, the propulsion system 102 defines a gas turbine engine, a ramjet, or other propulsion system including a fuel-oxidizer burner producing combustion products that provide propulsive thrust or mechanical energy output. In an embodiment of the propulsion system 102 defining a gas turbine engine, the inlet section 104 includes a compressor section defining one or more compressors generating an overall flow of oxidizer 195 to the hybrid combustor 100. The inlet section 104 may generally guide a flow of the oxidizer 195 to the hybrid combustor 100. The inlet section 104 may further compress the oxidizer 195 before it enters the hybrid combustor 100. The inlet section 104 defining a compressor section may include one or more alternating stages of rotating compressor airfoils. In other embodiments, the inlet section 104 may generally define a decreasing cross sectional area from an upstream end to a downstream end proximate to the hybrid combustor 100.

As will be discussed in further detail below, at least a portion of the overall flow of oxidizer 195 is mixed with a fuel 163 (shown in FIG. 2) to generate combustion products 138. The combustion products 138 flow downstream to the exhaust section 106. In various embodiments, the exhaust section 106 may generally define an increasing cross sectional area from an upstream end proximate to the hybrid combustor 100 to a downstream end of the propulsion system 102. Expansion of the combustion products 138 generally provides thrust that propels the apparatus to which the propulsion system 102 is attached, or provides mechanical energy to one or more turbines further coupled to a fan section, a generator, or both. Thus, the exhaust section 106 may further define a turbine section of a gas turbine engine including one or more alternating rows or stages of rotating turbine airfoils. The combustion products 138 may flow from the exhaust section 106 through, e.g., an exhaust nozzle 135 to generate thrust for the propulsion system 102.

As will be appreciated, in various embodiments of the propulsion system 102 defining a gas turbine engine, rotation of the turbine(s) within the exhaust section 106 generated by the combustion products 138 is transferred through one or more shafts or spools 110 to drive the compressor(s) within the inlet section 104. In various embodiments, the inlet section 104 may further define a fan section, such as for a turbofan engine configuration, such as to propel air across a bypass flowpath outside of the hybrid combustor 100 and exhaust section 106.

It will be appreciated that the propulsion system 102 depicted schematically in FIG. 1 is provided by way of example only. In certain exemplary embodiments, the propulsion system 102 may include any suitable number of compressors within the inlet section 104, any suitable number of turbines within the exhaust section 106, and further may include any number of shafts or spools 110 appropriate for mechanically linking the compressor(s), turbine(s), and/or fans. Similarly, in other exemplary embodiments, the propulsion system 102 may include any suitable fan section, with a fan thereof being driven by the exhaust section 106 in any suitable manner. For example, in certain embodiments, the fan may be directly linked to a turbine within the exhaust section 106, or alternatively, may be driven by a turbine within the exhaust section 106 across a reduction gearbox. Additionally, the fan may be a variable pitch fan, a fixed pitch fan, a ducted fan (i.e., the propulsion system 102 may include an outer nacelle surrounding the fan section), an un-ducted fan, or may have any other suitable configuration.

Moreover, it should also be appreciated that the hybrid combustor 100 may further be incorporated into any other suitable aeronautical propulsion system, such as a turboshaft engine, a turboprop engine, a turbojet engine, a ramjet engine, a scramjet engine, etc. Further, in certain embodiments, the hybrid combustor 100 may be incorporated into a non-aeronautical propulsion system, such as a land-based or marine-based power generation system. Further still, in certain embodiments, the hybrid combustor 100 may be incorporated into any other suitable propulsion system, such as a rocket or missile engine. With one or more of the latter embodiments, the propulsion system may not include a compressor in the inlet section 104 or a turbine in the exhaust section 106.

Figure 2:
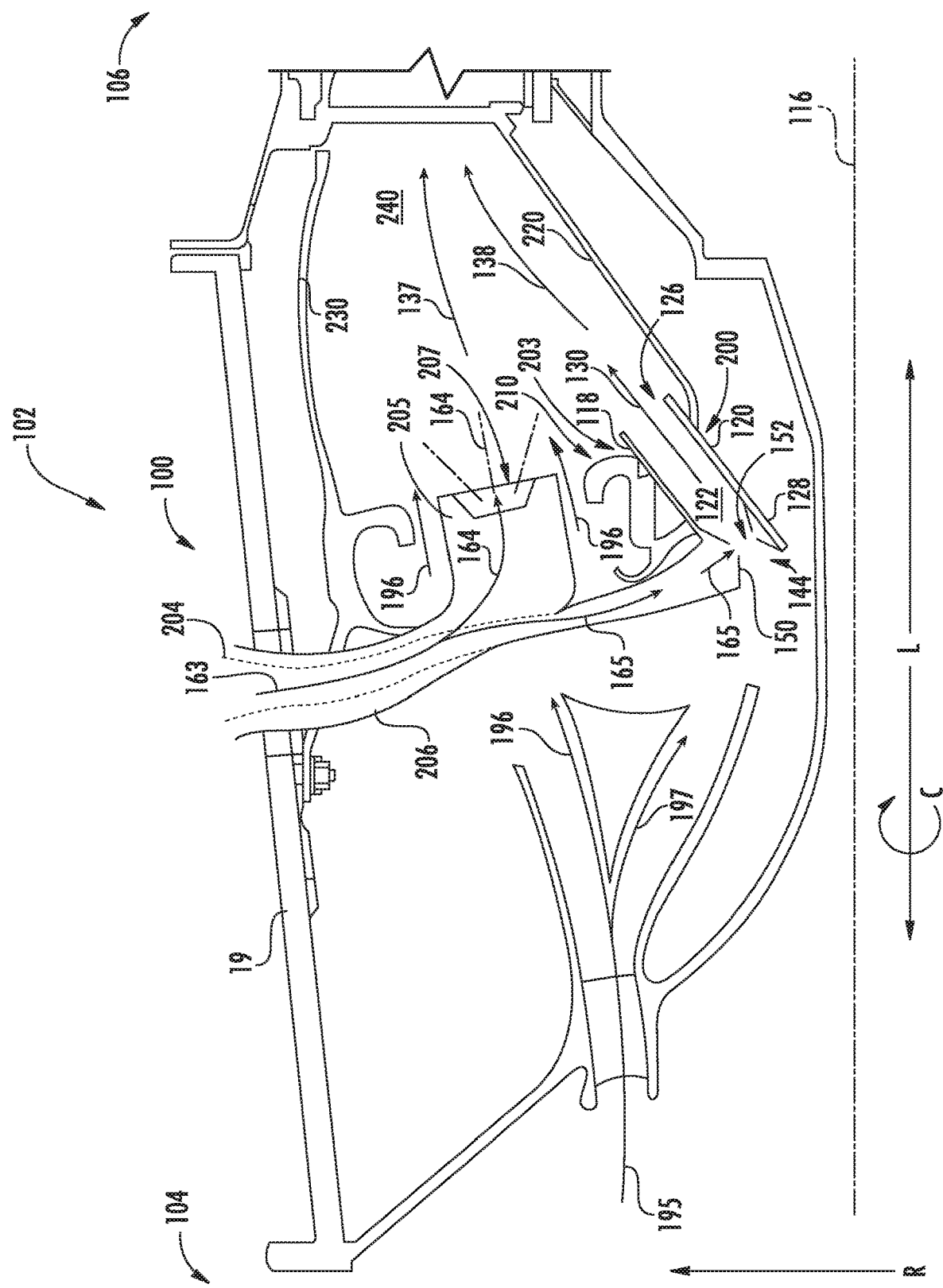
FIG. 2 is a cross-sectional view of an exemplary embodiment of a hybrid combustion system incorporating a rotating detonation combustion system in accordance with an exemplary embodiment of the present disclosure.

Referring now to FIG. 2, an exemplary embodiment of the hybrid combustor 100 is generally provided. The hybrid combustor 100 defines a rotating detonation combustion system 200 ("RDC system 200") disposed through a bulkhead wall 210. The bulkhead wall 210 defines an RDC outlet 203 through the bulkhead wall 210. The bulkhead wall 210 is disposed at an upstream end of an inner liner 220 and an outer liner 230 each extended generally along the longitudinal direction L from the bulkhead wall 210. The outer liner 230 is disposed outward of the inner liner 220 along the radial direction R. The bulkhead wall 210, the inner liner 220, and the outer liner 230 together define a primary combustion chamber 240. The primary combustion chamber 240 generally defines an annular combustor disposed around the longitudinal centerline 116. A fuel manifold assembly 205 extends at least partially through the bulkhead wall 230. A fuel manifold assembly exit 207 is defined through the bulkhead wall 210 adjacent to and in fluid communication with the primary combustion chamber 240.

The hybrid combustor 100 generally defines a deflagrative combustion system and a rotating detonation combustion system. For example, the outer liner 230, the inner liner 220, and the bulkhead wall 210, and the fuel manifold assembly 205 together at least partially define a deflagrative combustion system. The RDC system 200, including, at least in part, the fuel manifold assembly 205 defines the rotating detonation combustion system. As such, the deflagrative combustion system may provide efficient operation (e.g., emissions, fuel burn, operability, etc.) at a first operating condition and the rotating detonation combustion system may provide further improved operation of the propulsion system 102 at a second condition.

In various embodiments, the fuel manifold assembly 205 includes one or more manifolds or walled conduits 204 directly to the RDC system 200 providing a second flow of fuel 165 to the RDC system 200 independently controlled from the first flow of fuel 164 to a fuel nozzle 206 flowing fuel to the primary combustion chamber 240. For example, the fuel manifold assembly 205 may be configured to provide the first flow of fuel 164 to the primary combustion chamber 240 at a first operating condition and a second flow of fuel 165 to the RDC system 200 at a second operating condition different from the first operating condition.

In other embodiments, the fuel manifold assembly 205 includes a plurality of fuel nozzles 206 extended radially through an outer casing 19 of the propulsion system 102 generally surrounding the RDC system 200 (e.g., a diffuser case). The plurality of fuel nozzles 206 may be configured to provide a first flow of fuel 164 to the primary combustion chamber 240 and a second flow of fuel 165 to the RDC system 200. For example, the fuel nozzles 206 may each include a flow regulating structure (e.g., a valve assembly) that provides the first flow of fuel 164 that provides the first flow of fuel 164 at a first operating condition and the second flow of fuel 165 at a second operating condition.

Figure 3:
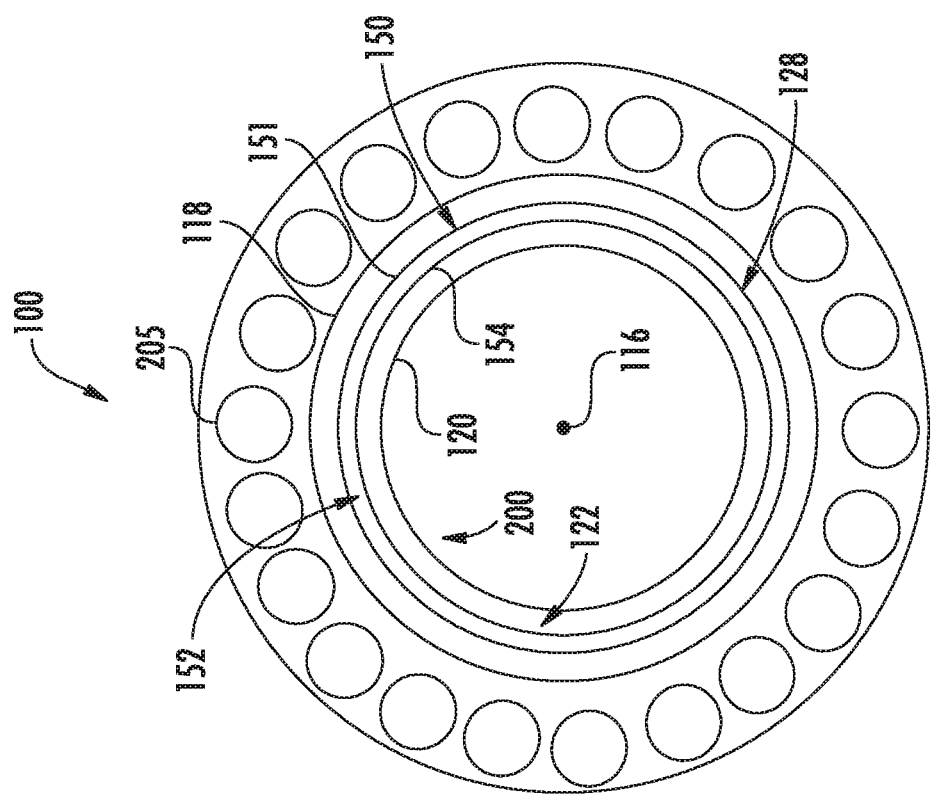
FIG. 3 is a cross-sectional view of a forward end of a rotating detonation combustion system in accordance with an exemplary embodiment of the present disclosure.

Referring now to FIG. 3, an exemplary embodiment of the RDC system 200 is generally provided. The RDC system 200 includes an annular outer wall 118 and an annular inner wall 120 each generally concentric to the longitudinal centerline 116. The outer wall 118 and the inner wall 120 together define a rotating detonation combustion chamber 122 ("RDC chamber 122"), and a RDC inlet 124. The RDC system 200 further includes a nozzle assembly 128 defined by a nozzle wall 150. The nozzle assembly 128 defines a lengthwise direction extended between a nozzle inlet 144 and a nozzle outlet 146. A nozzle flowpath 148 is defined by the nozzle wall 150 between the nozzle inlet 144 and the nozzle outlet 146. The nozzle inlet 144 is configured to receive a flow of oxidizer 195 from the inlet section 104. The nozzle assembly 128 further defines a throat 152 between the nozzle inlet 144 and the nozzle outlet 146. The nozzle assembly 128 defines a converging-diverging nozzle in which the nozzle wall 150 generally decreases in cross sectional area from approximately the nozzle inlet 144 to approximately the throat 152, and in which the nozzle wall 150 generally increases in cross sectional area from approximately the throat 152 to approximately the nozzle outlet 146.

The nozzle assembly 128 further defines a fuel injection port 162 through the nozzle wall 150 configured to provide a flow of fuel 163 to the oxidizer 195 flowing through the nozzle flowpath 148. In various embodiments, the fuel injection port 162 is in fluid communication with the fuel manifold assembly 205. In one embodiment, the fuel manifold assembly 205 is configured to divide or split the flow of fuel 163 into a first flow of fuel 164 provided to the primary combustion chamber 240 and a second flow of fuel 165 provided to the nozzle assembly 128 of the RDC system 200.

Figure 4:
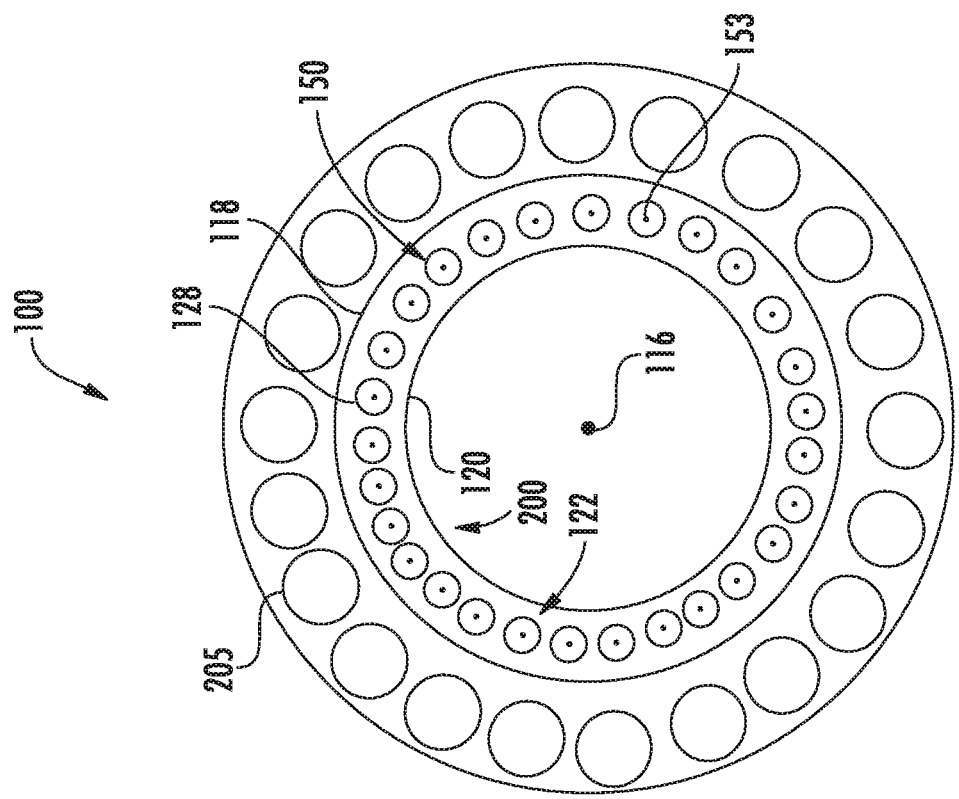
FIG. 4 is a cross-sectional view of a forward end of a rotating detonation combustion system in accordance with another exemplary embodiment of the present disclosure.

Referring briefly to FIGS. 3-4, in conjunction with FIGS. 1-2, cross sectional views of exemplary embodiments of a downstream end of the hybrid combustor 100 viewed toward the upstream direction are generally provided. Each embodiment includes a plurality of the fuel manifold assembly 205 in adjacent arrangement along the circumferential direction C around the longitudinal centerline 116. In the embodiments provided, the RDC system 200 is defined inward along the radial direction R of the fuel manifold assembly 205. However, it should be appreciated that in other embodiments the RDC system 200 may be defined outward of the fuel manifold assembly 205 along the radial direction R. The RDC system 200 includes the outer wall 118 and the inner wall 120 together defining the RDC chamber 122 therebetween along the radial direction R.

Referring to FIG. 3, in one embodiment the hybrid combustor 100 defines the nozzle assembly 128 of the RDC system 200 as an annular nozzle assembly 128 generally concentric to the longitudinal centerline 116. The nozzle assembly 128 defines the nozzle wall 150 as an inner annular nozzle wall 151 and an outer annular nozzle wall 154 defining the throat 152 therebetween along the radial direction R. A plurality of the fuel injection port 162 (not shown in FIG. 4) are each disposed in circumferential arrangement within the annular nozzle assembly 128, providing fuel 165 to the nozzle flowpath 148 and mixed with the oxidizer 196 (shown in FIG. 2).

Referring to FIG. 4, in another embodiment the hybrid combustor 100 defines a plurality of the nozzle assembly 128 of the RDC system 200 in which each nozzle assembly 128 is in adjacent arrangement along the circumferential direction C around the longitudinal centerline 116. The nozzle assembly 128 defines a plurality of the nozzle wall 150 in which each nozzle wall 150 is concentric to a nozzle centerline 153 extended along the longitudinal direction L through the nozzle flowpath 148. In other words, each nozzle centerline 153 is disposed in circumferential arrangement around the longitudinal centerline 116. The nozzle centerline 153 extends through the throat 152 of each nozzle assembly 128. The flow of fuel 165 (shown in FIG. 2) enters through each fuel injection port 162 (shown in FIG. 2) of each nozzle assembly 128 and mixes with the oxidizer 196 that flows through each nozzle assembly 128.

Although not shown herein, it will be appreciated that the RDC system 200 may be arranged in annular circumferential arrangement around the longitudinal centerline 116. In one embodiment, the RDC system 200 may further the arranged in radial arrangement (i.e., circumferential arrays occupying a plurality of radii from the longitudinal centerline 116). In still another embodiment, a plurality of the nozzle assembly, or more specifically, the throats 152 of the nozzle assembly 128, may be disposed in adjacent radial arrangement from the longitudinal centerline 116.

Referring now to FIGS. 1-2, during operation of the propulsion system 102, the flow of oxidizer 195 is generated from the inlet section 104. In one embodiment, the flow of oxidizer 195 is generated by receiving the oxidizer (e.g., air) from a launch vehicle (e.g., the propulsion system 102 defining a ramjet or scramjet). In other embodiments, the inlet section 104 may provide the oxidizer 195 from one or more pressurized vessels containing the oxidizer (e.g., air or oxygen, etc.). In another embodiment, in which the propulsion system 102 defines a gas turbine engine, the inlet section 104 includes one or more compressors, a fan section, or both to generate the flow of oxidizer 195 to the hybrid combustor 100.

During a first operating condition of the propulsion system 102, the flow of oxidizer 195, or a portion thereof shown schematically by arrows 196, flows across the fuel manifold assembly 205 toward and into the primary combustion chamber 240. The oxidizer 196 mixes with the first flow of fuel 164 emitted from the fuel manifold assembly 205 into the combustion chamber 240. In various embodiments, the fuel manifold assembly 205 defines a premixing fuel nozzle assembly in which at least a portion of the oxidizer 196 mixes with at least a portion of the fuel 164 within the fuel manifold assembly 205. In still various embodiments, the fuel manifold assembly 205 may define a twin annular fuel nozzle in which the first flow of fuel 164 may be further subdivided into various flows of fuel, at least a portion of which is mixed with at least a portion of the oxidizer 196, emitted into the primary combustion chamber 240 and ignited to produce combustion gases 137.

During a second operating condition of the propulsion system 102 different from the first operating condition, the flow of oxidizer 195, or a portion thereof shown schematically by arrows 197, flows into the RDC system 200 through the nozzle inlet 144. The second flow of fuel 165 from the fuel manifold assembly 205 egresses into the nozzle flowpath 148 at approximately the throat 152. The second flow of fuel 165 mixes with the oxidizer 197 within the nozzle assembly 128 and within the RDC chamber 122 and is ignited to produce a detonation wave 130.

Figure 5:
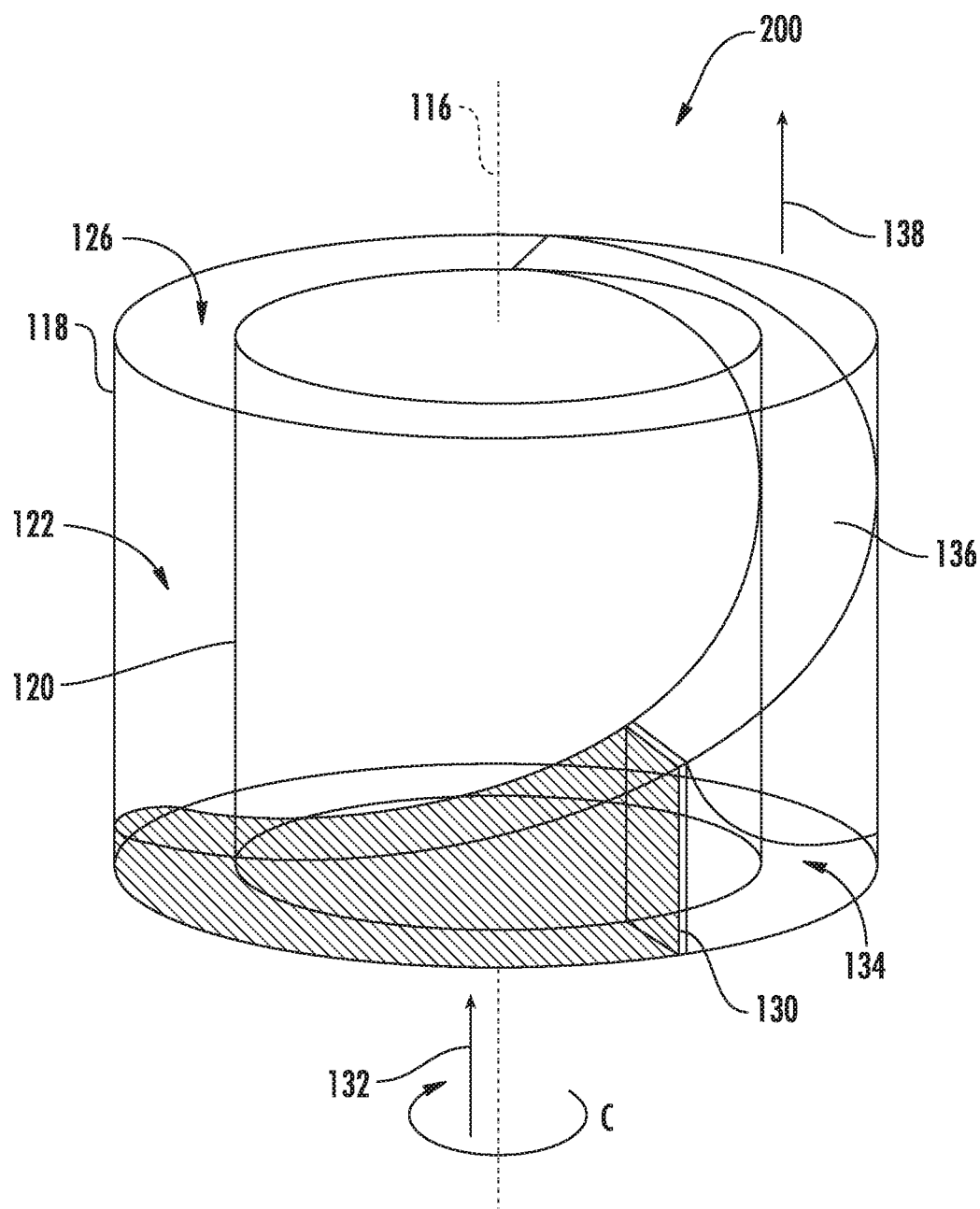
FIG. 5 is an exemplary embodiment of a combustion chamber of a rotating detonation combustion system in accordance with an embodiment of the present disclosure.

More specifically, and referring briefly to FIG. 5 providing a perspective view of the RDC chamber 122 (without the nozzle assembly 128) of the RDC system 200, it will be appreciated that the RDC system 200 generates the detonation wave 130 during operation. The detonation wave 130 travels in the circumferential direction C of the RDC system 200 consuming an incoming fuel/oxidizer mixture 132 and providing a high pressure region 134 within an expansion region 136 of the combustion. A burned fuel/oxidizer mixture 138 (i.e., combustion products) exits the combustion chamber 122 and is exhausted.

Referring to FIGS. 1-5, it will be appreciated that the RDC system 200 is of a detonation-type combustor, deriving energy from the continuous wave 130 of detonation in contrast to the ignition and combustion of the mixture of the first flow of fuel 164 and the oxidizer 196 within the primary combustion chamber 240 generally defining a deflagrative combustion in which the combustion gases 137 define an approximately constant pressure within the primary combustion chamber 240. For a detonation combustor such as the RDC system 200, the combustion of the fuel/oxidizer mixture 132 is effectively a detonation as compared to a burning such as generally provided in primary combustion chamber 240 with the mixture of the first flow of fuel 164 and the oxidizer 196.

Accordingly, a main difference between deflagration and detonation is linked to the mechanism of flame propagation. In deflagration, the flame propagation is a function of the heat transfer from a reactive zone to the fresh mixture, generally through conduction. By contrast, with a detonation combustor, the detonation is a shock induced flame, which results in the coupling of a reaction zone and a shockwave. The shockwave compresses and heats the fresh mixture 132, increasing such mixture 132 above a self-ignition point. On the other side, energy released by the combustion contributes to the propagation of the detonation shockwave 130. Further, with continuous detonation, the detonation wave 130 propagates around the combustion chamber 122 in a continuous manner, operating at a relatively high frequency. Additionally, the detonation wave 130 may be such that an average pressure inside the RDC chamber 122 is higher than an average pressure within the primary combustion chamber 240 defining a deflagration combustion system.

As such, the region 134 behind the detonation wave 130 defines very high pressures relative to the region upstream of the RDC chamber 122. As such, the nozzle assembly 128 of the RDC system 200 is configured to prevent the high pressures within the region 134 behind the detonation wave 130 from flowing in an upstream direction, i.e., into the incoming flow of the fuel/oxidizer mixture 132.

Referring now to FIGS. 1-5, in various embodiments the second operating condition of the propulsion system 102 defines an intermediate or mid-power condition (e.g., cruise) between a lowest pressure and temperature operating condition at the hybrid combustor 100 (e.g., ground idle) and a highest pressure and temperature operating condition (e.g., maximum take-off). For example, in reference to the landing and takeoff cycle of an embodiment of the propulsion system 102 providing propulsive thrust for an aircraft, the second operating condition defines one or more pressure and temperature conditions at the hybrid combustor 100 during steady flight at altitude following take-off and climb and prior to approach and landing, such as cruise. The first operating condition may refer to one or more operating conditions other than the second operating condition, such as, but not limited to, ignition or startup, ground idle, take-off, climb, flight idle, approach, landing, reverse thrust, etc. However, it should be understood that in the first operating condition may refer generally to one or more operating conditions other than the second operating condition at an intermediate or mid-power condition in other contexts, such as, but not limited to, industrial or marine gas turbine engines, rockets, missiles, auxiliary power units, and turboshaft or turboprop aircraft.

In still various embodiments, the fuel manifold assembly 205 is configured to provide the second flow of fuel 165 to the RDC system 200 during the second operating condition. The second operating condition may further define a generally steady state pressure and temperature condition at the hybrid combustor 100 for which the RDC system 200 is configured to produce a desired or optimal detonation cell size, quantity of detonation cells, or both relative to an annular width or gap, a combustion length, or both, of the RDC chamber 122. In one embodiment, the fuel manifold assembly 205 is further configured to discontinue or otherwise prevent the first flow of fuel 164 to the primary combustion chamber 240. In another embodiment, the hybrid combustor 100 is configured to provide the first flow of fuel 164 to the primary combustion chamber 240 for deflagrative combustion, thus producing the combustion gases 137, while further providing the second flow of fuel 165 to the RDC system 200 for detonation combustion, thus producing the burned fuel/oxidizer mixture 138.

During operation of the propulsion system 102 at the first operating condition, the fuel manifold assembly 205 may further be configured to discontinue or otherwise prevent the second flow of fuel 165 to the RDC system 200 for detonation combustion. The oxidizer 197 may therefore flow through the nozzle assembly 128 without mixing with the second flow of fuel 165 and further egress through the RDC chamber 122 into the primary combustion chamber 240.

Figure 6:
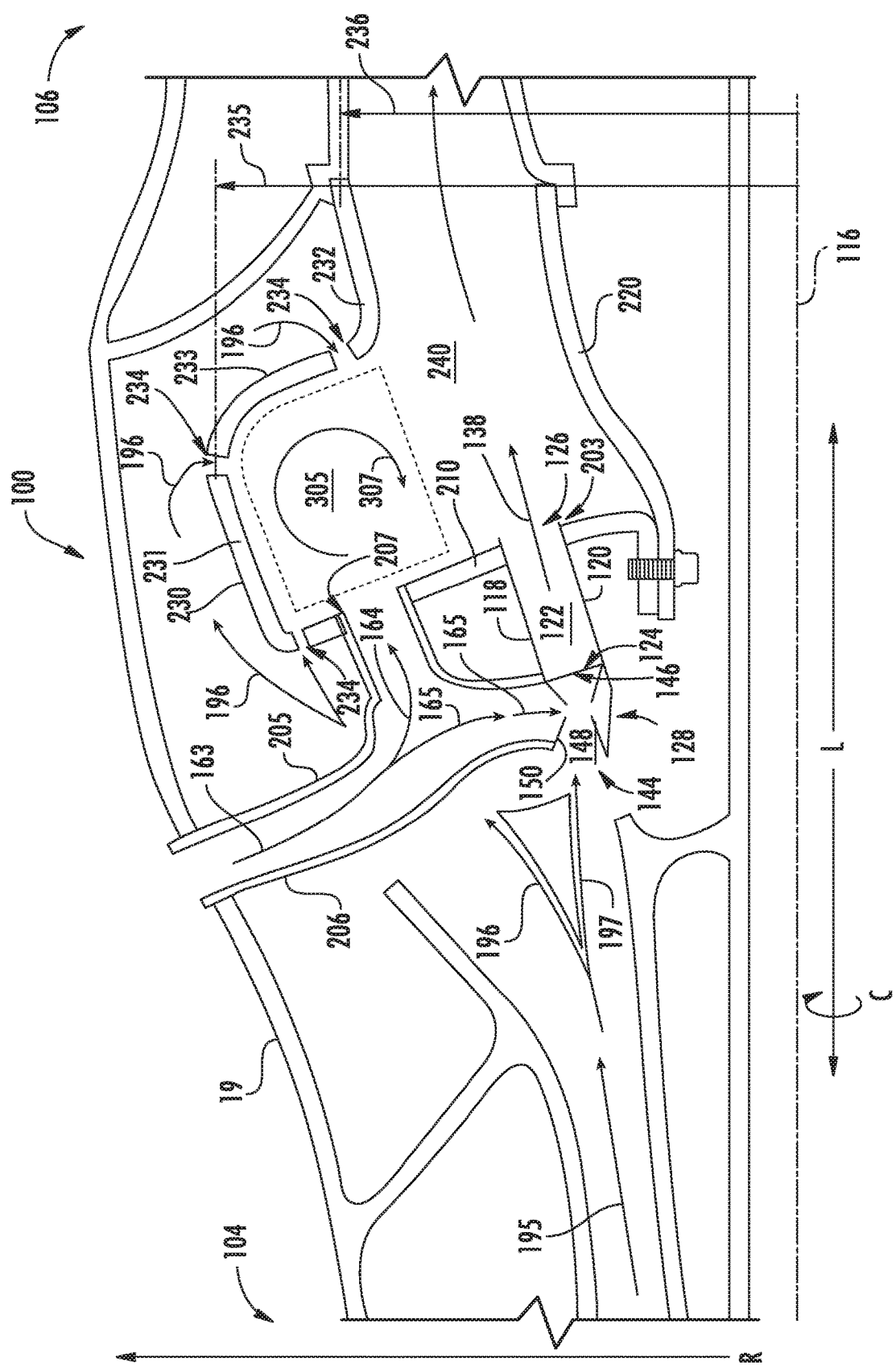
FIG. 6 is a cross-sectional view of another exemplary embodiment of a hybrid combustion system incorporating a rotating detonation combustion system in accordance with an exemplary embodiment of the present disclosure.

Referring now to FIG. 6, another exemplary embodiment of the hybrid combustor 100 is generally provided. The hybrid combustor 100 provided in FIG. 6 may be configured substantially similarly as the exemplary embodiment generally provided in FIGS. 1-5. However, in FIG. 6, the hybrid combustor 100 is configured as a trapped vortex combustor with the RDC system 200. The trapped vortex combustor defines a trapped vortex cavity 305 within the primary combustion chamber 240 defined by the bulkhead wall 210, the outer liner 230, and the inner liner 220. More specifically, the outer liner 230 defines a first wall 231 at a first radius 235, a second wall 232 at a second radius 236, and a transition wall 233 therebetween coupling the first wall 231 and the second wall 232 of the outer liner 230.

In various embodiments, one or more of the outer liner 230 and the bulkhead wall 210 defines a secondary airflow opening 234 adjacent to the primary combustion chamber 240. The secondary airflow opening 234 may be defined through one or more of the first wall 231, the second wall 232, and the transition wall 233 of the outer liner 230 adjacent to the trapped vortex cavity 305 of the primary combustion chamber 240.

During operation of the hybrid combustor 100, a portion of the flow of oxidizer 195, shown schematically as arrows 196, flows through one the secondary airflow openings 234 through one or more of the bulkhead wall 210 and the outer liner 230. The oxidizer 196 flows through the secondary airflow openings 234 to at least partially induce a swirl within the primary combustion chamber 240, or more specifically, the trapped vortex cavity 305 of the primary combustion chamber 240. The portion of the flow of oxidizer 195, shown schematically as arrows 197, may flow through the RDC system 200 during the first operating condition of the propulsion system 102 without mixing with a fuel. The oxidizer 197 flows from the RDC chamber 122 into the primary combustion chamber 240 and may further induce a swirl within the trapped vortex cavity 305. Thus the RDC system 200, when the second flow of fuel 165 is not flowing during the first operating condition, defines a chute flow of the oxidizer 197 to the primary combustion chamber 240.

The first flow of fuel 164 enters the primary combustion chamber 240, or more specifically the trapped vortex cavity 305, and is mixed with the oxidizer 196 entering through the secondary airflow openings 234. The mixture of the fuel 164 and oxidizer 196 within the trapped vortex cavity 305 is shown schematically by arrows 307. The fuel-oxidizer mixture 307 generally defines a recirculating flow within the trapped vortex cavity 305 defined between the bulkhead wall 210 and the outer liner 230, such as the first wall 231 and the transition wall 233. The RDC system 200 generally provides a chute through which the oxidizer 197 flows into the primary combustion chamber 240 and transports the combustion gases from the fuel-oxidizer mixture 307 toward the exhaust section 106.

In one embodiment, the second flow of fuel 165 flows into the nozzle assembly 128 at the first operating condition and mixes with the oxidizer 197 within the nozzle flowpath 148 and RDC chamber 122. However, the fuel-oxidizer mixture 130 may further flow, un-ignited, to the primary combustion chamber 240 at which point the fuel-oxidizer mixture 130 from the RDC system 200 mixes with the fuel-oxidizer mixture 307 of the trapped vortex cavity 305 and is then ignited and mixed within the primary combustion chamber 240.

Figure 7:
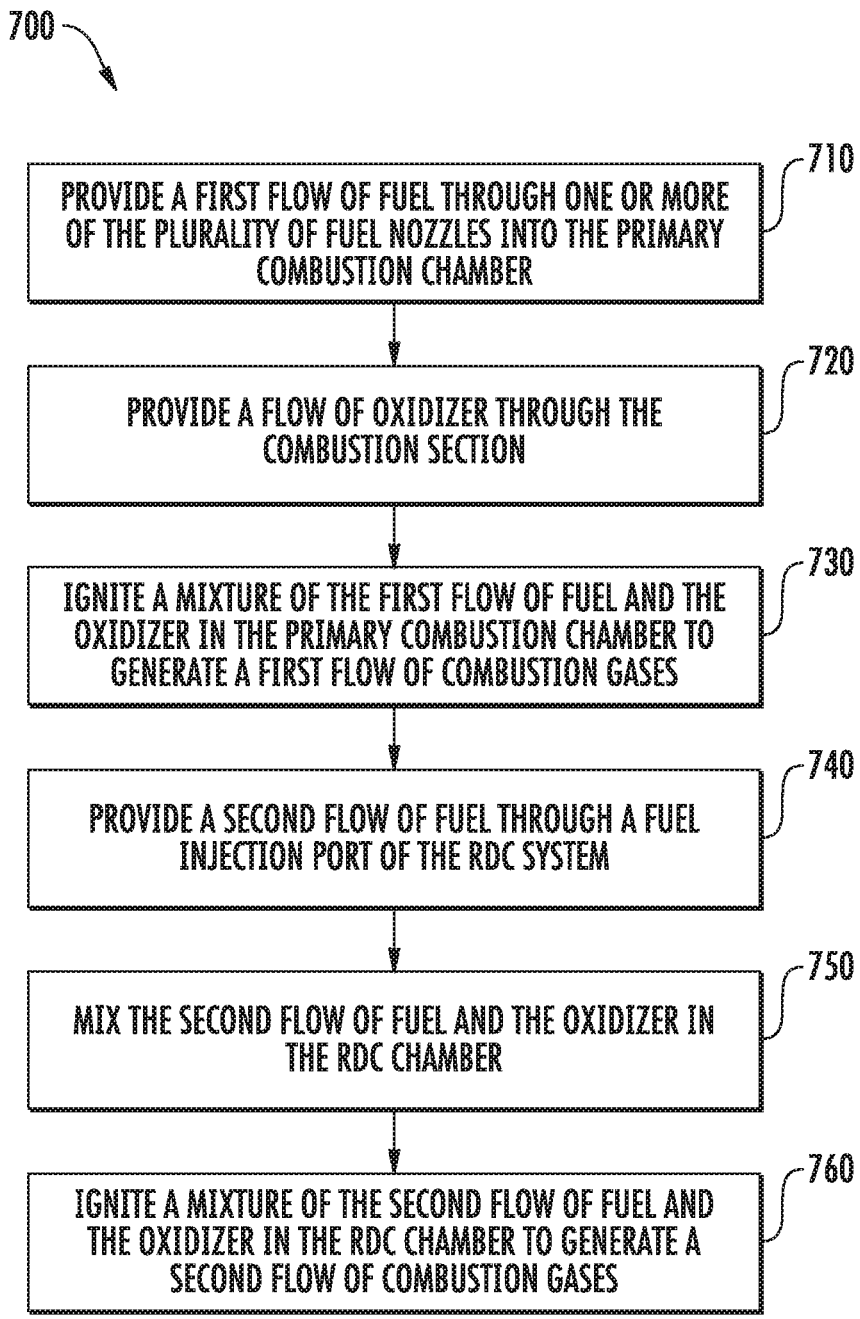
FIG. 7 is a flowchart including steps of an exemplary embodiment of a method of operating a hybrid combustion propulsion system incorporating a rotating detonation combustion system.

Referring now to FIG. 7, a method of operating a hybrid combustion propulsion system incorporating a rotating detonation combustion system is generally provided (hereinafter, "method 700"). The method 700 may utilize benefits of a rotating detonation combustion system ("RDC system"), such as improved specific fuel consumption, improve fuel burn, and lower emissions, while overcoming inefficiencies of utilizing a RDC system at operating conditions (e.g., pressure, temperature at the RDC system) outside of the design point of the RDC chamber (i.e., conditions other than those for which the RDC chamber is sized to produce a desired or optimal detonation cell size or quantity). The method 700 may be implemented with a propulsion system and RDC system such as those shown and described in regard to FIGS. 1-6. FIG. 7 depicts steps performed in a particular order for purposes of illustration and discussion. Those of ordinary skill in the art, using the disclosures provided herein, will understand that the various steps of any of the methods disclosed herein can be modified, adapted, expanded, rearranged, and/or omitted in various ways without deviating from the scope of the present disclosure.

The hybrid combustion propulsion system general includes the hybrid combustor 100 shown and described in regard to FIGS. 1-6 and variations thereof. The method 700 includes at 710 providing a first flow of fuel through one or more of the fuel manifold assembly exit into the primary combustion chamber; at 720 providing a flow of oxidizer through the combustion section; at 730 igniting a mixture of the first flow of fuel and the oxidizer in the primary combustion chamber to generate a first flow of combustion gases; at 740 providing a second flow of fuel through a fuel injection port of the RDC system; at 750 mixing the second flow of fuel and the oxidizer in the RDC chamber; and at 760 igniting the mixture of the second flow of fuel and the oxidizer in the RDC chamber to generate a second flow of combustion gases.

In various embodiments at 710, providing a first flow of fuel through the fuel manifold assembly exit into the primary combustion chamber includes providing the first flow 164 through the fuel manifold assembly 205 into the primary combustion chamber 240 such as shown and described in regard to FIGS. 1-6.

In one embodiment at 720, providing a flow of oxidizer through the primary combustion chamber (e.g., primary combustion chamber 240) includes generating a flow of oxidizer at a first operating condition of the propulsion system, such as the flow of oxidizer 195 shown and described in regard to FIGS. 1-6. In one embodiment at 730, igniting a mixture of the first flow of fuel (e.g., fuel 164) and the oxidizer (e.g., oxidizer 196) in the primary combustion chamber (e.g., primary combustion chamber 240) includes igniting the fuel-oxidizer mixture in the primary combustion chamber at the first operating condition, such as described previously herein.

In another embodiment at 720, providing a flow of oxidizer through the combustion section includes generating a flow of oxidizer at a second operating condition, such as shown and described in regard to FIGS. 1-6. In one embodiment at 740, providing a second flow of fuel (e.g., fuel 165) through a fuel injection port (e.g., fuel injection port 162) occurs at the second operating condition, such as described previously herein. Still further, in various embodiments at 750, mixing the second flow of fuel (e.g., fuel 165) and the oxidizer (e.g., oxidizer 197) occurs at the second operating condition different from the first operating condition.

In still another embodiment, providing a second flow of fuel (e.g., fuel 165) through the RDC system includes discontinuing a first flow of fuel (e.g., fuel 164) through one or more of the fuel manifold assembly exit (e.g., fuel manifold assembly 205). However, in other embodiments, providing the second flow of fuel 165 to the RDC system 200 may occur at least in part concurrently with providing the first flow of fuel 164 to the primary combustion chamber 240.

In yet another embodiment, providing the second flow of fuel to the RDC system may include mixing the fuel 165 with the oxidizer 197 and providing the fuel-oxidizer mixture to the primary combustion chamber 240 and igniting the fuel-oxidizer mixture in the primary combustion chamber 240.

In one embodiment of the method 700 at 720, providing a flow of oxidizer through the combustion section includes providing a first flow of oxidizer (e.g., oxidizer 196) through one or more of the fuel manifold assembly 205, the bulkhead wall 210, the inner liner 220, and the outer liner 230 to the primary combustion chamber 240. Providing a flow of oxidizer through the combustion section may further include providing a second flow of oxidizer (e.g., oxidizer 197) through the RDC system 200 to the primary combustion chamber 240. For example, providing the second flow of oxidizer 197 may provide a flow of oxidizer to at least in part define a trapped vortex combustor.

The hybrid combustor 100 and propulsion system 102 generally provided herein may provide the efficiencies of the RDC system 200 while maintaining operability and efficiency across a plurality of operating conditions of the propulsion system 102. The hybrid combustor 100 and methods of operation 700 generally provided herein may improve specific fuel consumption and fuel burn at one or more operating conditions while further maintaining operability at transient or extreme operating conditions. For example, the RDC system 200 may be configured and optimized for a steady state pressure and temperature condition at which the hybrid combustor 100 and propulsion system 102 may operate for extended periods of time while the primary combustion chamber 240 and fuel manifold assembly 205 are configured to operate at transient conditions greater and/or lesser than the extended operating conditions of the RDC system 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustion system for a propulsion system, the combustion system comprising:
   a rotating detonation combustion (RDC) system comprising a RDC chamber and a RDC inlet, the RDC system further comprising a nozzle configured to receive a flow of oxidizer, the nozzle configured to selectively receive a flow of fuel and provide the flow of fuel to the flow of oxidizer through the nozzle;
   a bulkhead wall coupling together an inner liner and an outer liner, wherein the inner liner, the outer liner, and the bulkhead wall together define a combustion chamber, and further wherein the RDC system and bulkhead wall together define a RDC outlet through the bulkhead wall and adjacent to the combustion chamber;
   a fuel manifold assembly extended at least partially through the bulkhead wall, wherein the fuel manifold assembly defines a fuel manifold assembly exit positioned adjacent to the combustion chamber; and
   a deflagrative combustion system formed at least by the inner liner, the outer liner, the bulkhead wall, and the fuel manifold assembly.

2. The combustion system of claim 1, wherein the fuel manifold assembly is further in fluid communication with the nozzle of the RDC system to provide the flow of fuel to the RDC system.

3. The combustion system of claim 2, wherein the RDC system comprises a fuel injection port in fluid communication with the fuel manifold assembly, the fuel manifold assembly configured to selectively provide the flow of fuel to the fuel injection port.

4. The combustion system of claim 3, wherein the fuel injection port of the RDC system comprises a fuel outlet opening positioned between a nozzle inlet and a nozzle outlet, wherein the fuel outlet opening is configured to provide the flow of fuel from the fuel manifold assembly to the RDC chamber.

5. The combustion system of claim 4, wherein the nozzle inlet and the nozzle outlet together form a converging-diverging nozzle.

6. The combustion system of claim 2, wherein the fuel manifold assembly is configured to selectively provide the flow of fuel to the nozzle of the RDC system, and further wherein the fuel manifold assembly is configured to selectively provide a flow of fuel to the combustion chamber through the fuel manifold assembly exit.

7. The combustion system of claim 6, wherein the fuel manifold assembly is configured to provide a first flow of fuel to the combustion chamber at a first operating condition and a second flow of fuel to the nozzle of the RDC system at a second operating condition different from the first operating condition.

8. The combustion system of claim 6, wherein the fuel manifold assembly exit is formed through the bulkhead wall.

9. The combustion system of claim 1, wherein the RDC system comprises a plurality of the nozzle each positioned in adjacent arrangement along a circumferential direction.

10. The combustion system of claim 1, wherein the nozzle of the RDC system comprises a nozzle wall extended generally annularly around a longitudinal centerline.

11. The combustion system of claim 1, wherein the deflagrative combustion system comprises a trapped vortex cavity within the combustion chamber.

12. The combustion system of claim 11, wherein the deflagrative combustion system comprises a first wall at a first radius, a second wall at a second radius different from the first radius, and a transition wall therebetween coupling the first wall and the second wall, and wherein the first wall, the second wall, and the transition wall together form the trapped vortex cavity.

13. The combustion system of claim 12, wherein the first wall, the second wall, and the transition wall are formed at one or more of the inner liner, the outer liner, or the bulkhead wall of the deflagrative combustion system.

14. The combustion system of claim 11, wherein at least one of the bulkhead wall, the outer liner, and the inner liner comprises one or more oxidizer openings adjacent to the combustion chamber.

15. The combustion system of claim 14, wherein at least one of the oxidizer openings is positioned adjacent to the trapped vortex cavity.

16. The combustion system of claim 1, wherein the RDC system comprises an annular outer wall and an annular inner wall together forming the RDC chamber.

17. The combustion system of claim 1, wherein the nozzle of the RDC system comprises a nozzle inlet configured to receive the flow of oxidizer to the RDC chamber.

18. The combustion system of claim 17, wherein the nozzle of the RDC system comprises a nozzle outlet, and wherein a nozzle throat is formed between the nozzle inlet and the nozzle outlet.

19. The combustion system of claim 1, wherein the RDC system is positioned radially inward of the fuel manifold assembly.

* * * * *